Dec. 27, 1966  R. J. SMITH  3,294,377
CARBURETOR

Filed Dec. 13, 1963  3 Sheets-Sheet 1

INVENTOR.
ROBERT J. SMITH
BY
AGENT

Dec. 27, 1966   R. J. SMITH   3,294,377
CARBURETOR
Filed Dec. 13, 1963   3 Sheets-Sheet 3

3,294,377
CARBURETOR
Robert J. Smith, Florissant, Mo., assignor to ACF Industries Incorporated, New York, N.Y., a corporation of New Jersey
Filed Dec. 13, 1963, Ser. No. 330,360
4 Claims. (Cl. 261—39)

This invention relates to improvements in carburetors for an internal combustion spark ignition engine of the kind in which an air flow responsive air valve mechanism is operative in the air induction conduit upstream of the fuel nozzle outlets to create a degree of depression causing fuel discharge from the nozzle outlets into the air stream, and particularly to means providing an improved temperature compensation for the air/fuel mixture ratio (pounds of air per pound of fuel) delivered to the engine and for minimum engine speed setting (idle speed) in the carburetor.

It is well understood in the art that temperature has a direct effect on engine starting and on engine operation. At ambient temperatures below the middle seventies Fahrenheit, a cold start requires a richer fuel mixture than a restart at normal engine operating temperatures. The degree of mixture enrichment required to get an engine to fire and run decreases with increasing engine and ambient temperatures. Likewise, a successful cold start at temperatures below the middle seventies Fahrenheit requires an increase in the minimum engine speed to maintain stable engine idle during an engine warm-up period. As the engine operating temperature approaches normal, this increase in minimum engine operating speed at idle can be gradually reduced, but it is preferable that the control action for reducing idle speed during engine warm-up lag behind the control for decreasing fuel mixture ratio enrichment, especially at very low ambient temperatures. It is also desirable on cold starts to provide an engine speed setting which is optimum for a first fire at the cranking speed of a cold engine.

A carburetor of one air valve type has a movable air flow responsive valve acting as a variable air metering restriction in the mixture conduit and controlling a variable fuel metering restriction (fuel jet) in the high speed nozzle circuit. These two metering devices (air flow and fuel flow) are so connected that as the air valve opens indicating an increase in air flow through the mixture conduit, the variable fuel metering restriction is operated to increase fuel flow, but not always in direct proportion. The high speed nozzle circuit discharges through an open nozzle in the mixture conduit downstream of the air flow responsive valve but upstream of a manually operated throttle valve. When the throttle valve opens, the air flow responsive valve, as a flow restriction, causes a pressure depression on its downstream side sufficient to produce a flow of fuel through the variable fuel metering restriction, or jets to the nozzle. The opening in the fuel metering jet and the pressure drop across the jet determine the rate of fuel discharge into the air stream in the mixture conduit from the high speed fuel nozzle. Since the pressure drop across the fuel metering jet depends directly upon the degree of depression created in the mixture conduit by the air flow restriction effected by the air valve, the air valve carburetor is calibrated such that the degree of depression effected by the air vlave is proportional to the position of the air valve over the movable range of the air valve. Thus, the fuel discharge and the air-fuel mixture ratio is a function of the depression created by the air valve. The mixture ratio is also a function of change in the size of the variable fuel metering restriction effected by movement of the air valve as pointed out above.

In the air valve carburetor, of the type described above, there is a certain indexed relationship between the movable air valve and the variable fuel metering restriction connected to and operated therefrom. The variable fuel metering is accomplished by a contoured metering rod in a fixed jet. The rod is variable in size throughout the portion of the rod traveling in the jet, and the indexed position between rod and air valve is such as to meter the proper amount of fuel throughout the range of air valve and rod movement. This basis arrangement between rod and air valve permits calibration to meet engine requirements in the full throttle range. A separate low speed fuel metering circuit takes care of the fuel metering for minimum engine idle speed and the off-idle range of throttle position. Both the high and low speed circuits are supplied through the variable fuel metering restriction of the high speed circuit. The low speed circuit has discharge ports opening in the mixture conduit at, and below, the edge of the throttle valve.

In a carburetor such as above described, there is one main metering point (neglecting air bleeds) in the high speed fuel circuit, which is the variable fuel metering restriction, or metering rod and jet. The low speed fuel circuit also has a metering point formed by a calibrated restriction in the circuit. Once these fuel circuits are properly calibrated to the right mixture ratio to run an engine at normal operating temperature for that engine, the metering should not be changed. It should be understood, however, that calibration of a carburetor for start and run at normal operating temperatures of the engine would not be a suitable calibration at lower than normal engine operating temperatures or ambient temperatures. This calibration would not start a cold engine nor keep the engine running until normal engine operating temperatures are reached. Accordingly, it is one of the objects of this invention to provide temperature compensation for the fuel mixture ratio calibration in a carburetor of the air valve type described.

It is still a further object of this invention to provide a carburetor of the air valve type as described with a temperature compensated control for obtaining a stable engine minimum speed at idle, when started, and during the period of engine warm-up into the normal range of engine operating temperatures.

It is still a further object of this invention to obtain a range of fuel mixtures producing a good cold start, smooth engine operation during the subsequent warm-up period, and solid throttle response at all temperatures of engine operation.

The improvement, as applied to a carburetor of the type above described, comprises a temperature responsive means applicable to the control of the variable fuel metering restriction, that is the metering rod, which, depending on the temperature sensed below a certain range, will change the indexed position between the air valve and the metering rod and, also change the datum position of the movable air valve, that is, the predetermined limit on the minimum closed position of the air valve. Further the improvement also comprises temperature compensation applied to increase the minimum engine idle speed setting without changing engine or mixture control setting for normal engine temperature operation.

Other objects and advantages of this invention will appear from the following description which is in such clear, concise and exact terms as will enable any person skilled in the art to make and use the same when taken in conjunction with the accompanying drawings, forming a part thereof, and in which.

Figure 1:
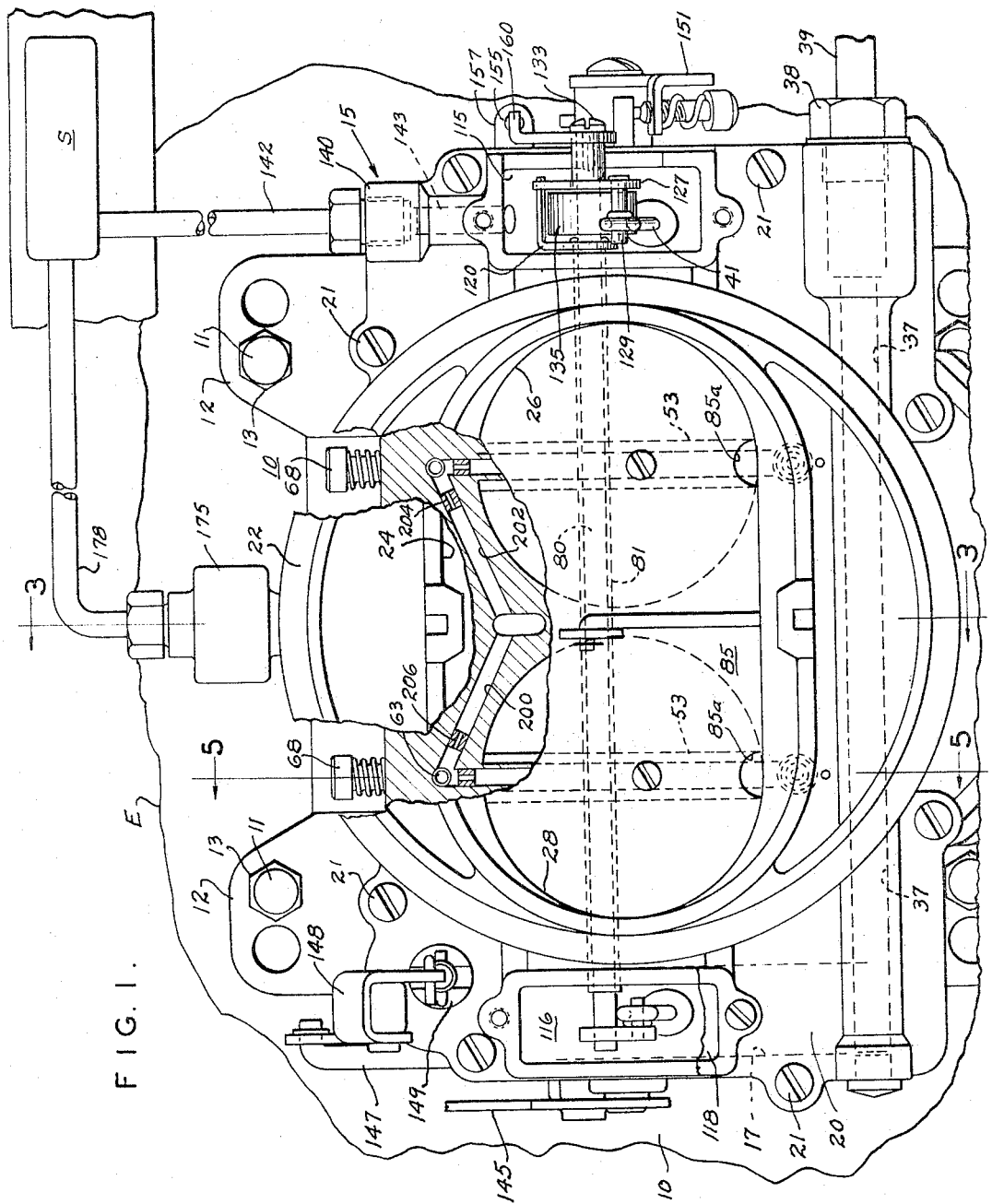
FIGURE 1 is a top plan view of a novel carburetor in accordance with the invention, as mounted on an engine.

FIGURE 6 is a schematic representation showing in full lines the position of the parts of the metering system of the carburetor of FIGURE 1 in the start position of a cold engine and in dotted lines the relative position of the parts of the metering system during unloading; and FIGURE 7 is a schematic representation of the parts of the metering system during idling operation of a warm engine or in the start position of a warm engine.

FIGURE 8 is an exploded view of the parts of the carburetor in FIGURES 6 and 7.

Figure 2:
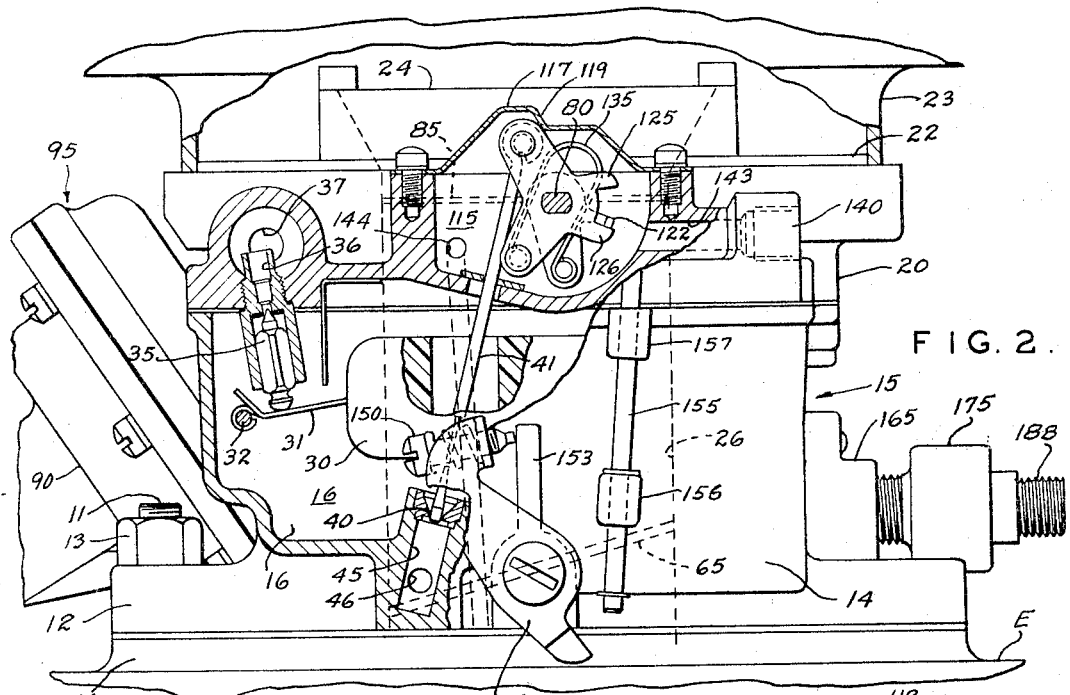
FIGURE 2 is a side elevation view of the carburetor of FIGURE 1 with an air filter with parts broken away to illustrate the internal structure of the carburetor.

With particular reference to FIGURES 1 and 2, the carburetor has a mounting flange 12 fixed to an intake manifold 10 of an engine E. Manifold 10 is provided with mounting studs 11. The carburetor is secured in place by nuts 13. With reference to FIGURE 1, the flange 12 is provided with four projecting ears, each of which are apertured for one or more studs projecting from the intake manifold flange 10. Pairs of holes in each ear provide for alternative location of the studs in the flange 12 which can vary from engine to engine. Returning now to FIGURE 2, the flange 12 is part of the body casting 14 of the carburetor 15. Each side of this body is hollow to form a pair of fuel bowls, designated by reference characters 16 and 17 in FIGURES 1 and 2.

The fuel bowls 16 and 17 are alike and contain like mechanisms, consequently a description of one will serve for both. The open top of each fuel bowl 16 and 17 is closed by a combined air horn and bowl cover casting 20 secured to the body of the carburetor 15 by a plurality of cap screws 21. Centrally of the casting 20 is a mounting ring 22 for an air cleaner element 23 indicated in FIGURE 2. The air horn 24 is oval in shape as appears in FIGURE 1 and is surrounded entirely by the mounting ring 22. Located between the two fuel bowls 16 and 17 are a pair of substantially identical mixture conduits 26 and 28 which form a continuation of the passage in the air horn 24 and extend through the body of the carburetor 15.

Figure 3:
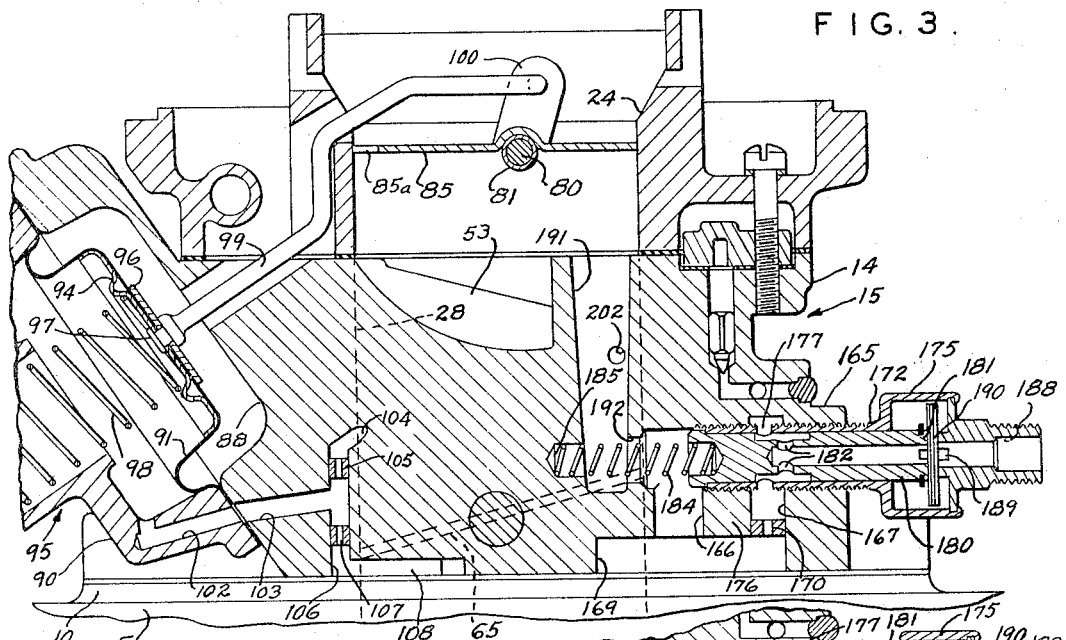
FIGURE 3 is a transverse sectional view taken on the line 3—3 of FIGURE 1 looking in the direction of the arrows.
Figure 4:
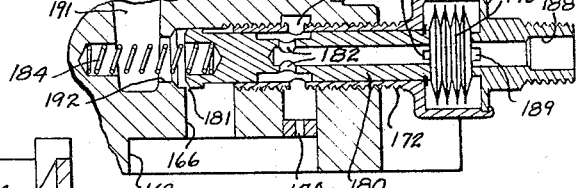
FIGURE 4 is a partial view, similar to FIGURE 3, showing operation of an idle speed during warm ambient conditions in accordance with the invention.

Mounted across the air horn 24 is an air valve 85, of oval shape to fit the air horn. Air valve 85 is eccentrically fixed to a tube 81 loosely mounted for rotation on a shaft 80 fixed transversely across the air horn 24, as shown in FIGURES 2, 3, and 4. The air valve 85 is unbalanced aerodynamically to move in an opening direction in response to an increased flow of air into the mixture conduits 26 and 28 during engine operation. To control the flow of air to the engine a pair of throttle valves 65 and 66 are provided in the air conduits 26 and 28 respectively. Both throttle valves are mounted on a single shaft 75 journaled for rotation in the carburetor body block 14. Shaft 75 extends beyond block 10 at both ends, to receive at one end a manually operable throttle lever 145 and at the other end an idle lever 151 (FIGURE 2).

Link 147 connects the throttle lever 145 with mechanism 148 actuating an acceleration pump 149. Another end of the lever 145 is secured to the manual control linkage.

Within each fuel bowl (FIGURE 2) is a float 30 mounted on an arm 31 hinged to a pin 32 fixedly mounted within the fuel bowl. Movements of the arm 31 in response to changes in fuel level sensed by the float 30 actuate a fuel inlet valve 35 in a passage 36 communicating with a fuel passage 37. As seen in FIGURE 1, fuel passage 37 extends across the fuel bowl cover 20 from one side to the other. A fuel inlet line 39 from a source of fuel is connected to the carburetor through a fitting 38 into the fuel passage 37. The fuel flow into the bowls 16 and 17 is controlled by identical valve and float structures. As the fuel level rises, the float 30 closes the valve 35 so as to limit the upper level to the fuel in the fuel bowl.

Figure 5:
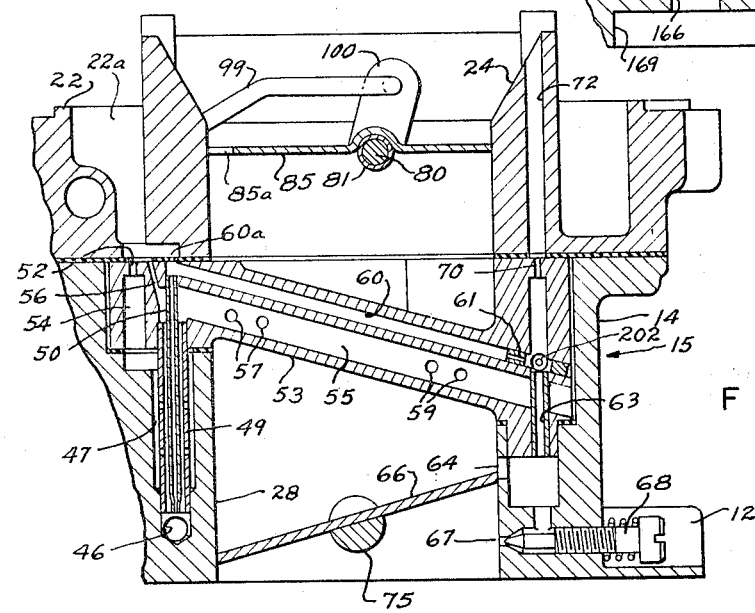
FIGURE 5 is a transverse sectional view taken on the line 5—5 of FIGURE 1 looking in the direction of the arrows.

In the bottom of the fuel bowls are identical metering restrictions. For example, as shown in FIGURES 2, 6, and 7, a fixed jet 40 is located in the bottom of fuel bowl 16 submerged beneath the fuel level. Within this jet is a fuel metering rod 41 with a tapered stepped portion 42 located between cylindrical portions 43 and 44. The rod and jet comprise a variable fuel metering restriction at the intake end of connected fuel passages 45 and 46, as shown in FIGURE 2. With reference to FIGURE 5, each fuel passage 46 extends across the carburetor to a different fuel well 47, each containing a vent tube 49 and an idle tube 50 arranged in a coaxial manner. The upper end of each fuel well 47 is connected to an air bleed vent 52 at the upper end of an expansion chamber 54. Each vent tube 49 communicates directly with a different high speed nozzle passage 55 in respective nozzle struts 53 extending across the mixture conduits 26, between the air valve 85 and the respective throttle valves 65 and 66. Air bleeds 56 connect each nozzle passage 55 with the space enclosed in mounting ring 22. Pairs of fuel outlets 57 and 59 are provided for the discharge of fuel from the main nozzle passages 55 respectively into the mixture conduits 26 and 28 from the high speed fuel circuit.

The low speed fuel circuit from each fuel bowl (FIGURE 5) includes a respective idle tube 50 having a restricted end 51 for metering idle fuel and communicating with a passage 60 in the respective strut 53, which includes a metering restriction 61. A restricted opening 60a connects fuel passage 60 with the space 22a open to the air passing through the air filter with the air horn. Fuel passing restriction 61 enters a passage 63 connected with a port 64 at the edge of the respective throttle valve 65 or 66 and a port 67 controlled by a needle valve 68 and discharging posterior of the throttle 66. Bleed 70 in passage 63 communicates with atmosphere through a vent passage 72 opening at the top of the air horn 24. The location of the fuel circuits and nozzles above described is the same in both mixture conduits 26 and 28. In each case, the outlets from the fuel nozzle passages 55 are posterior of, or downstream of, the air valve 85.

During engine operation, the amount of opening of the unbalanced air valve 85 in the air stream is under control of an air motor generally designated 95. This air motor 95 is located in a chamber formed by a cavity 88 (FIGURE 3) in the body casting 15 and by a removable cover 90 secured to the body casting 15. A diaphragm 91 has its periphery compressed and sealed between the cover 90 and body casting 15 surrounding the cavity 88. On opposite sides of the diaphragm 91 are respectively a pair of backing plates 94 and 96 centrally located with respect to the diaphragm 91 and secured to opposite sides thereof by the headed over end 97 of control rod 99. The opposite end of the control rod 99 is rotatably secured within an aperture in the end of an arm 100 in turn fixed to the air valve 85.

In the cover 90 of the motor 95 is a passage 102 registering with a passage 103 having branches and opening into the mixture conduits 26 and 28. Two branches 104 of the passage 103 each contain a metering restriction 105 and open in the mixture conduits 26 and 28 above the throttle 65 and 66 respectively. The other branch 106 of the passage 103 contains a metering restriction 107 and opens into a passage 108 which communicates with both mixture conduits 26 and 28 below the throttles 65 and 66.

Referring now to FIGURES 1, 2, 6 and 7, opposite ends of the air valve tube 81 and the air valve shaft 80 project from the sides of the air horn 20 into cavities 115 and 116 both of which are closed by covers, such as 117 and 118, held by cap screws. The end of tube 81, projecting into cavity 115, has fixed by brazing or other means, a forked lever 120 carrying an arm 121 and a dog 122. This dog 122 forms part of a lost motion type of connection between the tube 81 and the shaft 80 because it is located for limited rotation between lugs 125 and 126 of a compound lever 127 having arms 128 and 130 and secured to the shaft 80. Arm 128 has a pin 129 which protrudes through the eye of the upper end of the metering rod 41 extending into fuel bowl 16. Arm 130 has a pin 131 which protrudes through an eye 132 on one end of a U-shaped thermostatic strip 135. The other end of this strip 135 has an eye 134 receiving a pin 136 in arm 121 of lever 120. The thermostatic strip 135 controls the position of dog 122 between the limits set by lugs 125 and 126 and, consequently, the indexed position of the metering rod 41 with respect to the air valve 85.

Attached to the fuel bowl cover 20 is a fitting 140 for a tube 142 leading from a stove S heated by the exhaust manifold of the engine. Tube 142 connects with a hot air inlet 143 to the cavity 115 containing the thermostat 135 (FIGURE 2). An outlet 144 (FIGURE 2) connects with a passage leading posterior to the throttle valves 65 so that suction produced by the engine will create a circulation of hot air through the cavity 115.

Idle lever 151 carries at one end an adjustable idle screw 150 abutting a lug 153 on the body casting 14 to set the closed position of the throttles 65 and 66. The opposite end of the lever 151 is disposed beneath a rod 155 guided from vertical movement in clips 156 and 157. The upper end of the rod 155 in turn abuts against a lever 160 secured to the air valve shaft 80 (FIGURE 1).

With reference to FIGURES 3 and 4, located on side of the carburetor casting 14 opposite the air motor 95 is a boss 165 having a threaded passage extending inwardly of the body 15 to intersect at right angles with a pair of passages 166 and 167. Passage 166 connects through an aperture 192 in the carburetor wall with an air passage 191 opening at its upper end into the air horn 24 downstream of the air valve 85. This forms a bypass for air flow around throttles 65 and 66, when closed. Both of the passages 166 and 167 communicate with a passage 169 in the flange 12 of the carburetor communicating with the intake manifold passage below the throttles 65 and 66. One of these passages 167 contains a suitable metering restriction 170. A threaded hollow stem 172 of a casing 175 has threaded engagement in the boss 165 and extends through an aperture in a wall portion 176 separating the two passages 166 and 167. Radially spaced apertures 177 through the wall of hollow stem 172 communicate directly with passage 167. Slidable in the stem 172 is a hollow plunger 180 having a slotted end forming air inlet ports 181 and formed with air outlet ports 182 through the wall. The other end of the hollow plunger has a seat containing a spring 184 compressed between this seat and a seat in the body 15 of the carburetor indicated as 185. The spring 184 continually urges the plunger 180 outwardly of the stem 172.

Casing 175 has a threaded hollow connection 188 for a tube 178 leading from the aforementioned stove S. Connection 188 has a slotted inner end forming apertures 189 for the hot air from stove S to pass into the casing 175 and heat thermostatic disks 190, which are disposed between the slotted ends of the plunger 180 and connection 188. In the position of the plunger shown, the hot air passes from the casing 175 into the hollow plunger 180, through the apertures 182 and passage 177, through the metering restriction 170, passage 169 into the intake manifold of the engine. So long as the engine is running, there will be sufficient depression within the manifold below the throttle 65 to create a circulation of hot air over the thermostat disks 190. The position of the parts, as shown in FIGURE 3, is that which would exist in a cold condition, and, in this condition, air flow through the passage 191, outlet 192, passages 166 and 169 supplies air to the engine so long as the throttles 65 are closed or nearly closed.

When the thermostat disks 190 are heated (FIGURE 4), plunger 180 is forced to the left compressing spring 184. The spacing of the end of plunger 180 from its seat in passage 192 forms a restriction 181 which can be adjusted by the threaded stem 172 in boss 165. For curb idle at normal engine temperatures, throttle screw 150 is adjusted to completely close the throttles 65 and 66 and stem 172 is adjusted to space the end of plunger 180 from passage 192 to pass the right amount of air. This condition is shown in FIGURE 4. With this arrangement it is also possible to open the throttles by screw 150 and adjust stem 172 to completely close passage 192, or any combination of adjustments of screw 150 and stem 172 may be used to provide the required amount of idle air at normal temperatures. Bypass passage 191 is connected by two passages 200 and 202 respectively to the two idle passages 63, as indicated in FIGURES 1, 3, and 5. Passages 200 and 202 connect the bypass passage 191 upstream of restriction 192 with passages 63 downstream of the respective metering restrictions 61.

The operation is best explained by considering the function of the carburetor without temperature compensation and operating under conditions in which the engine is fully warmed up. At normal engine operating temperatures, with the engine warm the parts will assume positions as indicated schematically in FIGURES 4 and 7, with throttles 65 and 66 closed. Thermostat disks 190 will be expanded holding plunger 180 in its position against the bias of spring 184 as shown in FIGURE 3. To provide a normal idle operation the threaded sleeve 172 is turned to move inwardly until the end of the plunger 180 is spaced from the passage 192 to provide the restriction 181 for proper engine idle operation. With the throttles closed as described, idle fuel is pulled by the depression downstream of the throttles from the idle metering tube 50 and into the idle passage 60. Air passing from the air horn through the air bleed 60a breaks up this fuel and forms it into an atomized state and accelerates it through the restriction 61. Additional air from passage 72 coming through the bleed 70 leans the mixture and accelerates its delivery to the idle port 67. Because of passages 200 and 202 being upstream of the restriction 181 and downstream of the idle fuel restrictions 61, air will bleed through these passages 200 and 202 to further lean the idle mixture. Idle adjustment screws 68 as well as the bypass restriction 181 are adjusted to provide a proper idling speed at warm temperatures.

Thermostat 135, when heated, unwinds to spread its legs apart. Since motor spring 98 has forced lever arm 128 against cover 117 as a stop, expansion of thermostat 135 rotates shaft 80 with respect to sleeve 81 and rotates dog 122 toward a position against lug 125, as shown in FIGURE 7. Since the thermostat 135 is a spring, the parts will be held yieldingly in engagement. The higher the temperature, the greater the spring pressure forcing these parts together. The engagement of dog 122 and lug 125 determines the indexed position of the air valve 85 and the metering rod 41 during normal engine operation. Thermostatic spring 135 being stronger than the servo-motor spring 98 retains air valve 85 on a partial open position against the bias of spring 98. FIGURE 7 indicates the position the air valve will assume during curb idle and during starting under normal engine temperature. In this condition, the metering rod 41 is raised to its maximum extent to minimize fuel flow through jet 40 by the positioning of the large rod portion 44 within the jet. This indexed position of the rod in the jet will supply all the fuel necessary for engine operation in the idle and off idle speed range in which the fuel is flowing through the low speed circuit only. Adjustable idle ports, or outlets 67, supply the fuel at dead idle. In the off idle position for the throttles 65, ports, or outlets, 64 are uncovered to the depression beneath the throttle and come into operation to supply the necessary fuel-air mixture.

During this operation of the engine with the throttles 65 and 66 in the idle or off idle position, one end 106 of the branched passage 103 below the throttle is exposed to a high degree of depression, usually as much as eighteen inches of mercury suction pressure absolute at dead idle and in some instances as much as twenty-four inches of mercury suction pressure absolute at closed throttle deceleration. The upper outlet 104 of branched passage 103 is above the throttles where no degree of depression exists at all. Consequently, the high degree of suction at the outlet of the branched passage 103 below the throttles is bled off and valve 85 remains open to its datum position of twenty to thirty degrees.

When the throttles are opened wide from their idle speed setting, both outlets of branched passage 103 (upper and lower) are then subjected to the same depression pressure created by the air flow throttling effect of the air valve. Motor 95 responds immediately moving the air valve open until the force of the spring 98 balances the difference in pressure on opposite sides of diaphragm 92 and the forces of dynamic flow on unbalanced valve 85. Metering rod 41 moves with the air valve to increase the flow of fuel because tapered step 42 moves into the jet 10. Assuming the engine increases speed, the rate of flow of air will also increase. Air valve 85 responds to the increase in air flow because depression below the valve at branched passage 103 will tend to increase. Thus, the air valve opens as a function of the engine speed at wide open throttle. Rod 41 moves along with the air valve increasing fuel flow as the tapered step 42 moves into the jet. At top engine speed, step 43 is in the jet because air valve 85 is in its maximum open range. Preferably, the air valve mechanism is calibrated separately so as to maintain the air pressure drop across the air valve 85 as near constant as possible. This feature simplifies calibration of the fuel metering circuit.

The above description fits the conditions of full throttle operation, but not part throttle operation in which fuel metering must be modified to give a leaner economy mixture for light engine loads at low and intermediate engine speeds. After the upper edge of the throttles fully uncover ports 64, further opening initiates so-called part throttle range of operation. In this range, the air valve movement is a function of the degree of depression created by both air valve and throttle restriction as sensed by the lower outlet 106 of branched passage 103 and the degree of depression created by air valve restriction alone sensed by the upper outlet 104 of the branched passage 103. Because the load on the engine is relatively light, manifold suction is relatively high, possibly as much as twelve to fourteen inches of mercury absolute and at least seven inches of mercury absolute. In the part throttle range, both outlets from the branched passage 103 sense depression. This occurs only in this throttle range and results in depression pressures in passage 103 which will be intermediate of those sensed, a greater depression than that sensed above the throttle and a lesser depression than that sensed below. Because depression sensed is always higher as the throttle is operated in the part throttle range, air valve openings will be created which are always greater at any given rate of air flow than for the same rate of air flow at full throttle. The air valve must open far enough so that depression created by the air valve is always a less amount than at full throttle. A lesser degree of depression will decrease the rate of fuel flow through the nozzle apertures 57 and variable fuel metering restrictions 40. As above pointed out, this is one of the modes of operating an air valve carburetor. In this case, the outlets of the branched passage 103 are so located and so controlled by restrictions 105 and 107 that this decrease in rate of fuel flow is the predominant control of mixture regardless of the fact that the size of the variable fuel metering restriction 40 is increased for any given rate of air flow as compared with the same rate of air flow at full throttle. As the rate of fuel flow decreases, the mixture leans out to suit the economy mixture ratio desired. Closing the throttle at any engine speed closes the air valve to its datum position.

The operation of the above-described temperature compensation does not change the operation of this carburetor basically, but because of certain changes in relationship between the parts as altered by the temperature compensation certain changes in fuel mixture ratio delivered occur. These fuel mixture ratio changes cause enrichment of the fuel mixture delivered throughout the throttle operating range. Actual measurement of the air-to-fuel ratio as modified by the temperature compensation would reveal that the curves of air/fuel mixture at low temperatures are similar in shape to those delivered by the same carburetor without temperature compensation or with the temperature compensation responsive to an engine in the fully warmed up condition. The change effected by the temperature compensation at low temperatures of the engine amounts to raising the curve of air/fuel mixture ratios at all throttle positions and at all engine speeds. This does not mean necessarily that the curve is raised uniformly from the low to the high end. Nevertheless, the structure described could be designed to produce this result or raise either the end of the curve in a manner to meet the fuel mixture demands for a particular engine.

If ambient temperatures are below the seventy degree range, then, after the engine stops, thermostat strip 135 cools to the point where the legs move toward the positions shown in FIGURE 2. Dog 122 moves toward limiting lug 126. With lever 127 against stop 117, coil 135 with the bias of coil 98 slowly moves valve 85 from its datum position at normal operating temperatures toward a closed position. Further cooling closes the legs of coil 135. Lug 126 is a limit stop, and when dog 122 strikes lug 126, air valve 85 is closed and new indexed positions are now established between the rod 41 and the air valve 85 and with the cylindrical step 42 in the jet 40.

Thermostat disks 190 also contract so that plunger 180 opens the air bypass which extends from posterior of the air valve (anterior of the throttle) around and posterior of the throttles. The carburetor, as now described, is ready for a cold start.

On cranking, the air valve remains closed, because air velocity is low and has little tendency to open the air valve 85 against spring 98. Depression created by engine cranking both above and below the throttle is low so that motor 95 has insufficient power to overcome also spring 98. Under such a condition, valve 85 might open to some degree on each cylinder intake stroke. If this happens, of course, the depression below the air valve 85 during cranking is somewhat modulated, nevertheless, even if modulated, sufficient depression is operative through the open bypass 191 below the air valve to pull some fuel from the high speed as well as the low speed fuel circuits because less than an inch of water suction is necessary to raise the fuel in the circuits to the level of the nozzle outlets. The fact that all circuits are discharging at cranking speed instead of merely the low speed circuit as at normal engine temperatures, causes a very rich mixture to be delivered to the engine because very little air flow occurs through clearance aperture 85a past the closed air valve 85. What air does pass the air valve 85 flows through bypass passage 191 around the closed throttles to the engine so as to form the proper starting mixture.

After the engine fires and begins to run, during idle operation, air valve 85 opens slightly under action of the servomotor 95 but also controlled by the closed thermostatic spring 135. Under these conditions the engine speed will be higher than the original speed setting of the screw 150 because the bypass 191–169 is wide open and manifold vacuum extends upstream to passages 202 and 204 opening into the bypass passage. Passages 202 and 204 cease to be air bleeds to the idle system so that a greater flow of fuel takes place through the idle circuits to mix with the air flow through the open bypass 191. The manifold depression downstream of the throttles 65 and 66 partially opens the air valve 85 until the pressure differential across the valve balances the motor spring 98. This results in the action of the air valve in creating its calibrated degree of depression and it is this depression acting on all the nozzle outlets which creates a fuel discharge into the mixture conduit. Thus, although the auxiliary air flowing through the bypass tends to lean out the mixture delivered by the low speed circuit, this leaning out tendency is more than compensated by the operation of the high speed circuit at idle speeds. As the throttles move into the off idle range, the air valve must move still farther open as the engine speeds up and because of the indexed position between air valve 85 and rod 41 determined by the cold thermostat 135, the metered rate of flow will be greater at each degree of air valve opening (FIGURE 6). Actually the tapered step 42 of the needle 41 is in the jet 40 before the throttle moves out of the off idle range so, at the start and throughout the part throttle, the mixture enrichment continues. When full throttle is reached, air valve 85 has long since moved the metering rod step 43 into the jet 40. This means that the rate of fuel metering at full throttle is actually reached in the part throttle range. If motor 95 has a range of movement only sufficient to fully open the valve 85 then during cold engine operation, full opening of valve 85 would not be possible. Thus, it might be stated that when the engine is operating cold, full engine operating speed is limited not by the throttle but by the air valve 85.

It is possible with the instant invention to achieve many different mixtures and engine minimum speeds by the temperature compensation described. For example, the thermostats used may be selected for different rates or degrees of temperature response. By selection and choice, temperature compensation of idle speed may lag temperature compensation of mixture or, it may precede on cooling and lag on heating. The same results may be obtained if thermostats of similar response are used provided the outlet from the stove circuit is hooked up in series to heat the strip 135 first and the disks 190 second.

Changes in and modifications of the construction described may be made without departing from the spirit of my invention or sacrificing its advantages.

What is claimed is:

1. A carburetor comprising a body having an air and fuel mixture conduit therethrough, a throttle valve mounted across said mixture conduit for movement from an open position to a position closing said mixture conduit, means for operating said throttle valve, an air valve mounted within said mixture conduit upstream of said throttle valve for movement from an open position to a position closing said mixture conduit, means for biasing said air valve toward a closed position against flow of air through said mixture conduit, said carburetor body including a fuel reservoir and a fuel passage extending from said fuel reservoir to said mixture conduit between the air valve and the throttle valve, a metering rod adapted to be positioned in said fuel passage for varying the fuel flow thereto, and means operatively connecting the metering rod to said air valve to vary the flow of fuel to said mixture conduit relative to the flow of air through said mixture conduit, said connecting means including temperature responsive means to vary the relationship between the flow of fuel to said mixture conduit and the flow of air through said mixture conduit in response to temperature, said temperature responsive means including a stop member holding said air valve in an open position above a predetermined ambient temperature and a bimetallic element between said stop and said air valve to move said air valve toward a closed position as said temperature drops below said predetermined value.

2. A carburetor comprising a body having an air and fuel mixture conduit therethrough, a throttle valve mounted across said mixture conduit for movement from an open position to a position closing said mixture conduit, means for operating said throttle valve, an air valve journaled for rotation in said body and extending transversely across said mixture conduit upstream of said throttle valve for movement from a closed position to an open position in response to air flow through said mixture conduit, means for supplying fuel to said mixture conduit, said carburetor body including a fuel reservoir and a fuel passage, said fuel passage extending from said fuel reservoir to said mixture conduit upstream of said throttle valve and having a restricted portion, a metering rod having one end of variable thickness positioned in said restricted fuel passage portion for varying fuel flow therethrough, a lever rotatably mounted on said carburetor body and having one arm thereof pivotally connected to said metering rod, means connecting the other arm of said lever to said air valve to provide a flow of fuel through said fuel passage relative to the flow of air through said mixture conduit, said connecting means including temperature responsive means to change the relationship between the flow of fuel and air, stop means in the path of movement of said lever to hold said air valve in an open position above a predetermined ambient temperature, said temperature responsive means operating to move said air valve toward closed position as said temperature drops below said predetermined value.

3. A carburetor comprising a body having an air and fuel mixture conduit therethrough, a throttle valve mounted across said mixture conduit for movement from an open position to a position closing said mixture conduit, means for operating said throttle valve, an air valve mounted within said mixture conduit upstream of said throttle valve for movement from an open position to a position closing said mixture conduit in response to air flow through said mixture conduit, a spring biasing said air valve closed, said carburetor body including a fuel reservoir and a fuel passage from said reservoir to said mixture conduit, means including a temperature responsive spring connected to said air valve and adapted to bias said air valve against said spring toward an open position upon engine warm-up above a predetermined temperature, means forming a first air passage to bypass air in said mixture conduit around the closed position of said throttle valve and a second air passage connecting said mixture conduit downstream of said air valve to air outside said carburetor, and temperature responsive valve means in said first and second air passages for limiting air flow through said first and second air passages at temperatures above said predetermined value.

4. A carburetor comprising a body having an air and fuel mixture conduit therethrough, a throttle valve mounted across said mixture conduit for movement from an open position to a position closing said mixture conduit, means for operating said throttle valve, an air valve mounted with said mixture conduit upstream of said throttle valve for movement from an open position to a position closing said mixture conduit in response to air flow through said mixture conduit, a spring biasing said air valve closed, said carburetor body including a fuel reservoir and a fuel passage from said reservoir to said mixture conduit, means including a temperature responsive spring connected to said air valve and adapted to bias said air valve against said spring toward an open position upon engine warm-up above a predetermined temperature, said carburetor body including a first air passage having one end opening into said mixture conduit between said air valve and said throttle valve and the other end thereof downstream of said throttle valve to bypass air around the closed position of said throttle valve, means forming a second air passage having one end thereof opening into said mixture conduit downstream of said throttle valve and the other end thereof adapted to be connected to a source of heated air, and temperature responsive valve means in said first and second air passages for limiting air flow through said first and second air passages at temperatures above said predetermined value.

References Cited by the Examiner

UNITED STATES PATENTS

| | | | |
|---|---|---|---|
| 1,830,562 | 11/1931 | Robbins | 261—50 X |
| 1,904,936 | 4/1933 | Stokes. | |
| 2,092,297 | 9/1937 | Allen | 261—50 X |
| 2,098,202 | 11/1937 | Weber | 261—50 X |
| 2,136,353 | 11/1938 | Weber | 261—50 X |
| 2,598,450 | 5/1952 | Shaff | 261—50 X |
| 2,986,380 | 5/1961 | Read | 261—39 |
| 2,996,051 | 8/1961 | Mick | 261—50 X |
| 3,023,744 | 3/1962 | Mick | 261—39 X |

HARRY B. THORNTON, *Primary Examiner.*

T. R. MILES, *Assistant Examiner.*